(12) United States Patent
Vasireddy et al.

(10) Patent No.: US 8,144,780 B2
(45) Date of Patent: Mar. 27, 2012

(54) DETECTING VISUAL GESTURAL PATTERNS

(75) Inventors: Srinath Vasireddy, Issaquah, WA (US);
 Sergey Chub, Redmond, WA (US);
 Gang Hua, Kirkland, WA (US); Ting-yi Yang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1211 days.

(21) Appl. No.: 11/859,800

(22) Filed: Sep. 24, 2007

(65) Prior Publication Data

US 2009/0080526 A1 Mar. 26, 2009

(51) Int. Cl.
 *H04N 7/12* (2006.01)
(52) U.S. Cl. ............... 375/240.16; 375/240.12
(58) Field of Classification Search .................. None
 See application file for complete search history.

(56) References Cited

U.S. PATENT DOCUMENTS

| | | | |
|---|---|---|---|
| 6,115,482 A | 9/2000 | Sears et al. | |
| 6,130,911 A * | 10/2000 | Lei | 375/240.16 |
| 6,249,606 B1 | 6/2001 | Kiraly et al. | |
| 6,256,033 B1 | 7/2001 | Nguyen | |
| 6,366,317 B1 * | 4/2002 | Mattison et al. | 348/241 |
| 6,424,676 B1 * | 7/2002 | Kono et al. | 375/240.16 |
| 6,466,198 B1 | 10/2002 | Feinstein | |
| 6,594,616 B2 | 7/2003 | Zhang et al. | |
| 7,053,932 B2 * | 5/2006 | Lin et al. | 348/208.1 |
| 7,236,611 B2 | 6/2007 | Roberts et al. | |
| 7,346,188 B2 * | 3/2008 | Aichi | 382/103 |
| 2002/0196854 A1 * | 12/2002 | Kim | 375/240.17 |
| 2003/0132974 A1 | 7/2003 | Bodin | |
| 2005/0114788 A1 | 5/2005 | Fabritius | |
| 2005/0210419 A1 | 9/2005 | Kela et al. | |
| 2005/0255434 A1 | 11/2005 | Lok et al. | |
| 2006/0083310 A1 * | 4/2006 | Zhang | 375/240.16 |
| 2006/0285595 A1 * | 12/2006 | Ha et al. | 375/240.16 |
| 2007/0067745 A1 * | 3/2007 | Choi et al. | 715/863 |
| 2007/0082710 A1 | 4/2007 | Jang | |

OTHER PUBLICATIONS

Wu et al., "Vision-Based Gesture Recognition: A Review", Beckman Institute, University of Illinois, Urbana, pp. 12.
Kolsch et al., "Vision-Based Interfaces for Mobility", 2004, IEEE, pp. 9.
Kortenkamp et al., "Recognizing and Interpreting Gestures on a Mobile Robot", in Proceedings of the Thirteenth National Conference on Artificial Intelligence (AAA- 96), pp. 7.

* cited by examiner

*Primary Examiner* — Phirin Sam
(74) *Attorney, Agent, or Firm* — Capitol City TechLaw; Richard C. Irving (57) ABSTRACT

A processing device and method are provided for capturing images, via an image-capturing component of a processing device, and determining a motion of the processing device. An adaptive search center technique may be employed to determine a search center with respect to multiple equal-sized regions of an image frame, based on previously estimated motion vectors. One of several fast block matching methods may be used, based on one or more conditions, to match a block of pixels of one image frame with a second block of pixels of a second image. Upon matching blocks of pixels, motion vectors of the multiple equal-sized regions may be estimated. The motion may be determined, based on the estimated motion vectors, and an associated action may be performed. Various embodiments may implement techniques to distinguish motion blur from de-focus blur and to determine a change in lighting condition.

20 Claims, 8 Drawing Sheets

DETECTING VISUAL GESTURAL PATTERNS

BACKGROUND

Existing portable processing devices may permit a user to provide input via a joystick, menu options, a keypad, a small keyboard, or a D-pad. The portable processing devices may be small in size and may have small display screens. For example, if a portable processing device displays a document on a small display screen, only a portion of the document may be displayed at any one time. To view an undisplayed portion of the document, a navigation command may be input to the portable processing device to cause the displayed document to be scrolled to the undisplayed portion of the document. Providing input to scroll displayed content on a small display screen of a portable processing device may be tedious and cumbersome.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for determining one or more motions and/or changes in lighting conditions, with respect to the processing device, and for performing an action based on detecting the one or more motions and/or changes in lighting conditions. In various embodiments, an adaptive search center technique may adapt search centers of multiple equal-sized regions of an image frame based on previously estimated motion vectors of respective ones of the multiple equal-sized regions. Based on one or more conditions of the processing device, one of several fast block matching methods may be selected for matching blocks of pixels of the multiple image frames and for estimating corresponding motion vectors. Particular motions may be detected based on the estimated motion vectors.

In some embodiments, a sequence of motions and changed lighting conditions may be recorded and associated with an action. Recognition of the recorded sequence of motions and lighting conditions may cause the associated action to be performed by a processing device.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a portable processing device having an image-capturing component for capturing a sequence of images. Analysis of the sequence of images may determine a motion or change in orientation of the portable processing device. For example, analysis of the sequence of images may determine whether the portable processing device is moved in a portrait orientation, a landscape orientation, a tilting motion, a panning motion, toward or away from an object (a depth motion), a rotation motion, a spinning motion, or other motion or orientation.

With respect to embodiments consistent with the subject matter of this disclosure, "motion" may be defined as an elementary piece of data found by a block matching algorithm, and "gesture" may be defined as a combination of elementary "motions", usually along a particular path (e.g., question mark, circle, bracket, etc.). One or more motions of the portable processing device may be associated with an action to be performed by the portable processing device. For example, one or more motions may be recognized as a gesture associated with an action, such as, starting a particular application, closing the particular application, or performing another action. In some embodiments, the portable processing device may record a sequence of motions to form a complex gesture. The complex gesture may be, for example, in a form of a circle, a rectangle, a triangle, or any other shape, which may be predefined or specified by a user. The complex gesture may be associated with an action to be performed by the portable processing device. Upon recognition of the complex gesture, the portable processing device may perform the action associated with the complex gesture.

In embodiments consistent with the subject matter of this disclosure, a particular motion of a portable processing device may be determined by using an adaptive search center technique to adapt a search center based on a previously estimated motion vector. One of several fast block matching methods may be selected to estimate a motion vector. The one of the several fast block matching methods may be selected based on one or more conditions. For example, in one embodiment, a condition of a battery, a CPU load, and/or historical matching accuracies of each of the several fast block matching methods may be considered when selecting the one of the several fast block matching methods.

In some embodiments, motion blur, which may occur due to a fast motion, may be distinguished from defocus blur, which may occur due to limitations of the image-capturing component. Thus, gestures, which may include one or more fast motions, may be associated with an action.

Some embodiments consistent with the subject matter of this disclosure, may recognize a change in lighting condition. For example, a user may pass an object, such as, for example, a hand or other object over the image-capturing component to temporarily block light from entering the image-capturing component. Such a motion may be known as a "wipe" and may be associated with an action, such as, for example, deleting a file, clearing a display screen, or another action. As another example, a detected change in lighting condition may cause an action to be performed, such as, for example, adjusting a backlighting of a display screen, or other action.

Exemplary Processing Device

Figure 1:
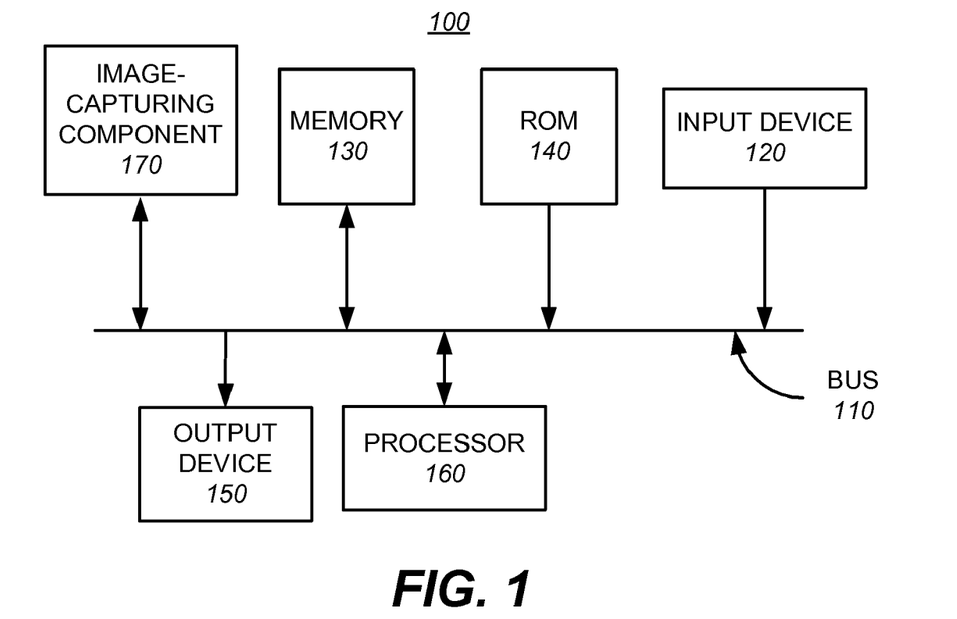
FIG. 1 illustrates a functional block diagram of a processing device, which may be used to implement embodiments consistent with the subject matter of this disclosure.

FIG. 1 is a functional block diagram of an exemplary processing device 100 consistent with the subject matter of this disclosure. Processing device 100 may include a bus 110, an input device 120, a memory 130, a read only memory (ROM) 140, an output device 150, a processor 160, and an image-capturing component 170. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Image-capturing component 170 may include a digital camera, or other device, for capturing and storing a sequence of images.

Input device 120 may include a keyboard, a joystick, a D-pad, one or more buttons, a touchscreen or other input device. Output device 150 may include one or more conventional mechanisms that output information, including one or more display screens, or other output devices.

Processing device 100 may perform such functions in response to processor 160 executing sequences of instructions contained in a tangible machine-readable medium, such as, for example, memory 130, ROM 140, or other medium. Such instructions may be read into memory 130 from another machine-readable medium or from a separate device via a communication interface (not shown).

Figure 2:
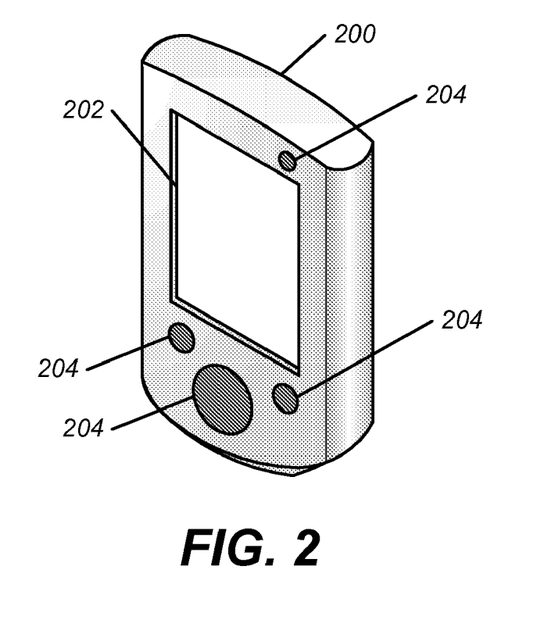
FIGS. 2 and 3 illustrate an exemplary portable processing device, which may be implemented by the processing device of FIG. 1.

FIG. 2 illustrates a front view of an exemplary portable processing device 200, which may be implemented by processing device 100 of FIG. 1. Processing device 200 may include a display screen 202 and one or more buttons 204 for providing input.

Figure 3:
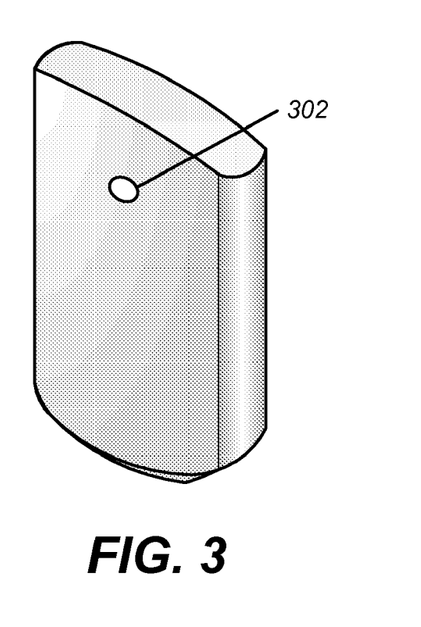

FIG. 3 illustrates a rear view of exemplary portable processing device 200. As can be seen in FIG. 3, portable processing device 200 may include a lens 302 of image capturing component 170 in a rear portion of portable processing device 200. In other embodiments, lens 302 may be located at other portions of portable processing device 200.

Figure 4:
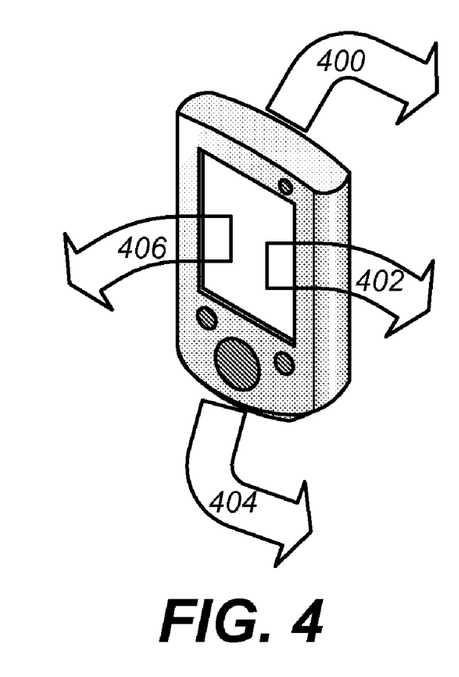
FIGS. 4-7 illustrate exemplary motions, which may be detected in embodiments consistent with the subject matter of this disclosure.

FIGS. 4-7 illustrate several motions, which may be detected by embodiments of portable processing device 200 consistent with the subject matter of this disclosure. In FIG. 4, arrows 400, 402, 404, 406 illustrate exemplary tilt motions, which may be detected by processing device 200. For example, a top portion of processing device 200 may be tilted, as indicated by an arrow 400, a right side portion of processing device 200 may be tilted, as indicated by arrow 402, a bottom portion of processing device 200 may be tilted, as indicated by arrow 404, and a left side portion of processing device 200 may be tilted, as indicated by arrow 406.

Figure 5:
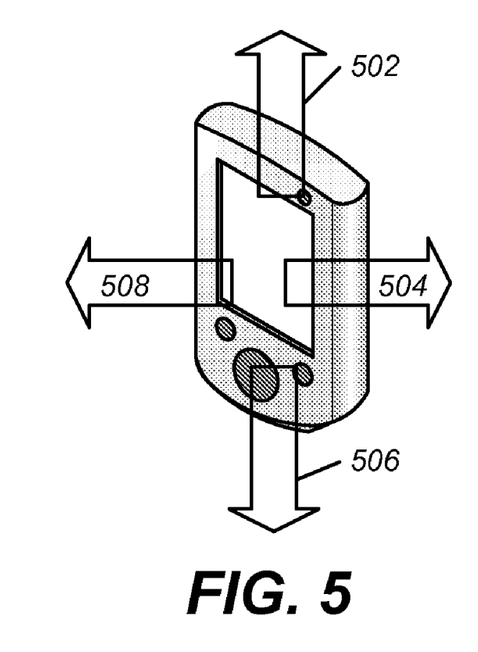

In FIG. 5, arrows of 502, 504, 506, 508 illustrate an exemplary panning motion, which may be detected by portable processing device 200. For example, portable processing device 200 may move in an upward direction 502, in a rightward direction 504, in a downward direction 506, and in a leftward direction 508. In other embodiments, other panning motions may be detected by processing device 200.

Figure 6:
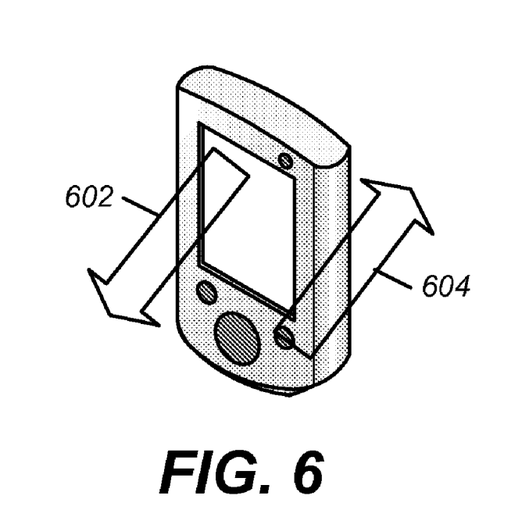

In FIG. 6, arrows 602, 604 illustrate exemplary zooming-in and zooming-out motions (a depth-in and depth-out motion). Arrow 602 illustrates an exemplary zooming-in motion, toward a user, and arrow 604 illustrates an exemplary zooming-out motion away from the user.

Figure 7:
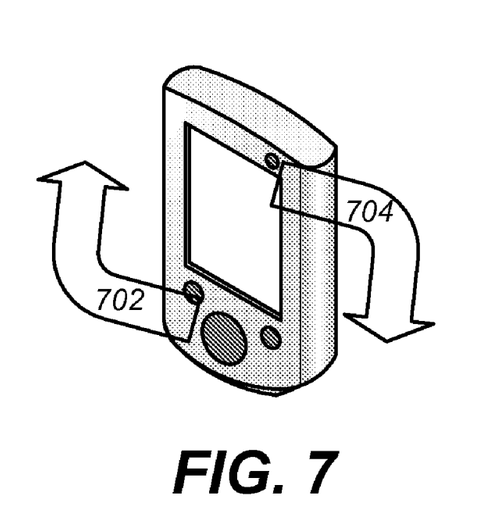

In FIG. 7, arrows 702-704 illustrates an exemplary rotation motion, which may be detected by portable processing device 200 in an embodiment consistent with the subject matter of this disclosure. Arrows 702-704 illustrate a clockwise rotation. In some embodiments, a counterclockwise rotation may be detected by portable processing device 200.

In some embodiments, other or different motions may also be detected, such as, for example, a spinning motion (a spiral action) in a clockwise or counterclockwise direction, or other motions or gestures, such as a check mark, question mark, circle, scratch-out, open/close square/curly brackets, as well as other motions or gestures.

Motion Vector Estimation

Figure 8:
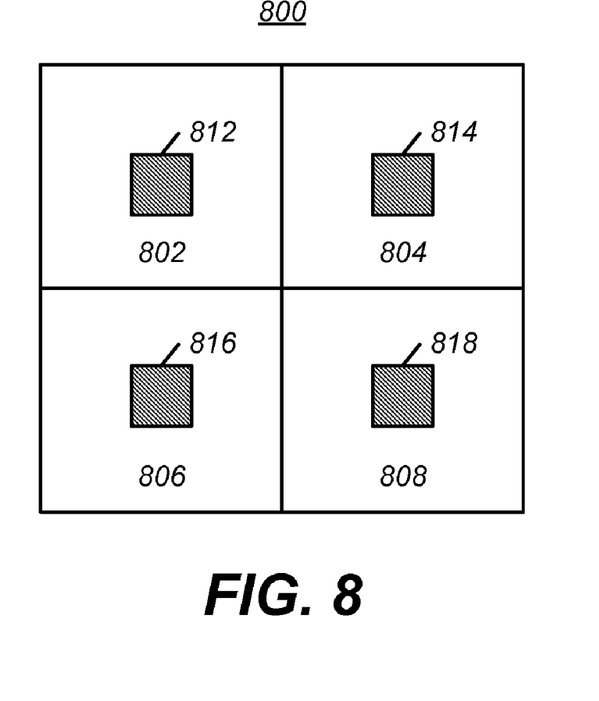
FIGS. 8-9 illustrate an exemplary adaptive search center scheme, which may be implemented in embodiments consistent with the subject matter of this disclosure.

Embodiments consistent with the subject matter of this disclosure may estimate motion vectors by using an adaptive search center technique. Using the adaptive search center technique, an image frame of a captured image may be partitioned into a number of equal regions. FIG. 8 illustrates an exemplary image frame 800 being partitioned into four equal regions, 802, 804, 806, 808. Each of regions 802, 804, 806, 808 may include center blocks 812, 814, 816, 818, respectively. Each of center blocks 812, 814, 816, 818 may be of size 16×16 pixels, or another suitable size. A sum of squared difference (SSD) of pixel intensities may be used as a matching criterion in one embodiment, with respect to comparing pixels of one image frame with pixels of another image frame. In one implementation, a square of pixel differences may be determined by using a look-up table to speed up a matching process.

Figure 9:
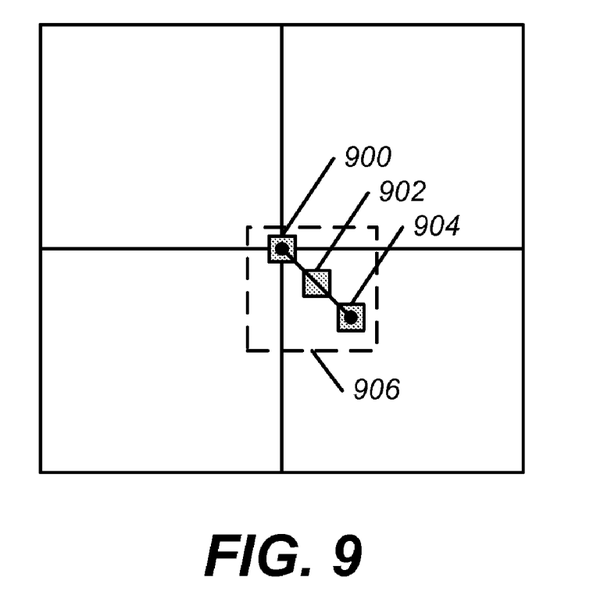

FIG. 9 illustrates an exemplary adaptive search center scheme, which may be implemented in embodiments consistent with the subject matter of this disclosure. A block 900 represents $v_{i-1}$, a motion vector from a previous frame, which may be denoted as O, a zero search center. Block 900 may be a center of any of center blocks 812, 814, 816 and 818. A block 902 may represent $O+0.5v_{i-1}$ and a block 904 may represent $O+v_{i-1}$. A searching range 906 is indicated by a dashed line. One of blocks 900, 902 and 904 having a smallest SSD, with respect to a zero search center of a corresponding region of a previous image frame, may be chosen as a search center to start a search for a match using one of several fast block matching methods. The fast block matching methods may include well-known fast block matching methods, such as, for example, a three step search (TSS), a four step search (FSS), a diamond search (DS), a hexagon search (HS), an adaptive multi-mode search (AMMS), as well as other matching methods.

In some embodiments, a selection of one of the fast block matching methods may be based on one or more conditions. The conditions may include battery power, processor load, historical matching accuracy of each of the fast block matching methods, as well as other conditions. For example, if the battery power of portable processing device 200 is below a certain level, then the HS method with adaptive search center may be employed. If the processor is heavily loaded, then either the HS method with adaptive search center, or the AMMS method with adaptive search center may be selected. Otherwise any of the fast block matching methods may be selected with adaptive search center. If a fast block matching method is selected based on historical accuracies of each of the methods, then a most accurate one of the methods may be selected. Historical matching accuracy of each method may be obtained by evaluating each method's accuracies every predetermined number of image frames and accumulating the accuracies over a shifting time window.

By selecting a particular fast block matching method, as described above, a more accurate but slower matching method may be used when more computation resources are available, and a less accurate but faster matching method may be used when fewer computation resources are available.

In order to reduce an affect of jittering noise, in some embodiments, motion vectors, with respect to each region of an image frame, may be averaged over a predetermined number of consecutive image frames, such as, for example, five consecutive image frames or another suitable number of consecutive image frames.

The above-mentioned example, illustrated by FIGS. 8-9, shows an image frame being divided into four equal regions. In other embodiments, an image frame may be divided into more or fewer equal regions.

The methods mentioned above, with respect to FIGS. 8 and 9, work with gray-scale images. Some portable processing devices may capture images in a YUV format. In this case, a Y component may be used directly. When images are captured in RGB format, a bit shift may be employed to transform RGB format to a gray-scale image format. For example, Y is approximately equal to (R shifted two bits to the right)+(G shifted one bit to the right)+(G shifted three bits to the right)+(B shifted three bits to the right).

Motion events may be defined based on motion vectors estimated for each region of each image frame. With respect to the above example having four equal regions, if all four motion vectors are pointing left, then a motion event of a portable processing device, such as, for example, portable processing device 200, may be a right motion event, because portable processing device 200 may be moving to the right.

Exemplary Processing

Figure 10:
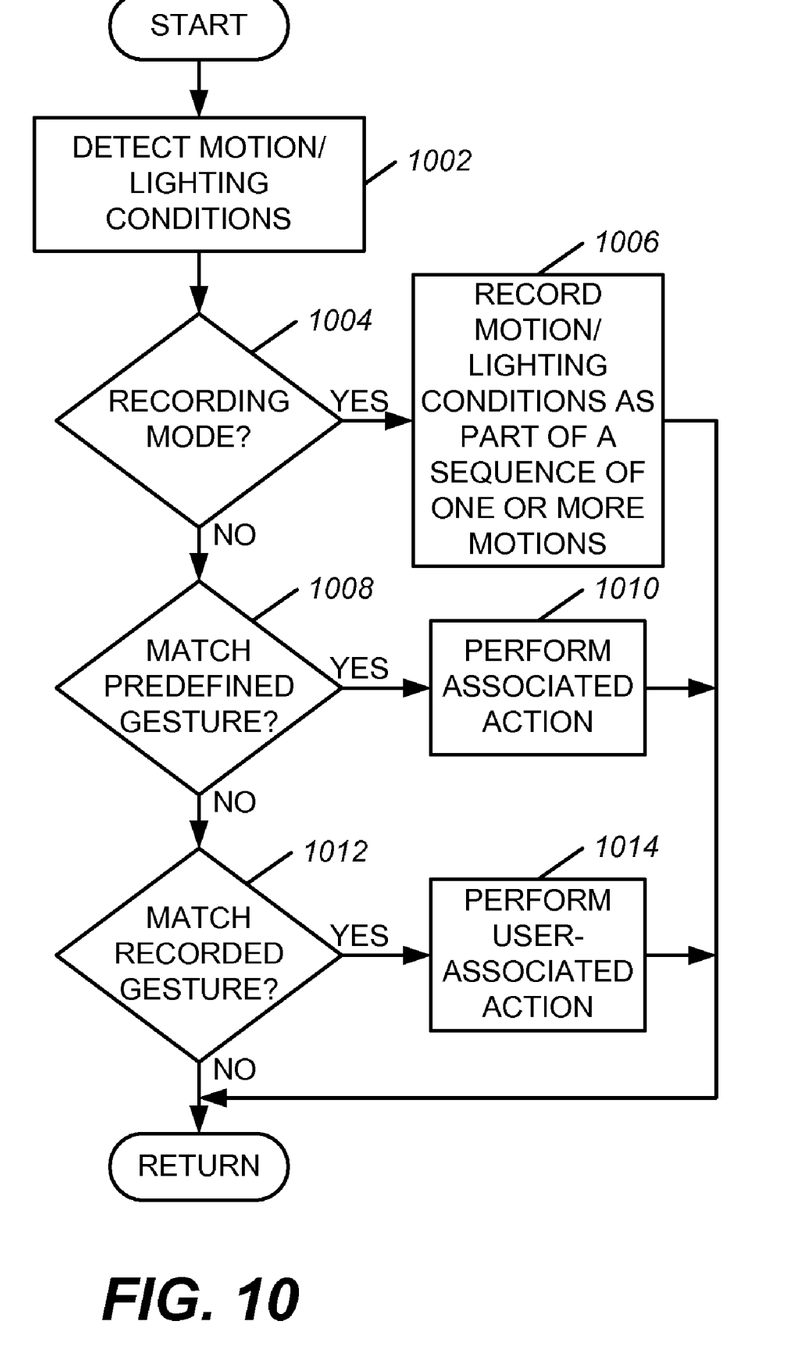
FIG. 10 is a flowchart illustrating an exemplary process for detecting motions and/or lighting conditions and performing actions, based thereon, in embodiments consistent with the subject matter of this disclosure.

FIG. 10 is a flowchart of an exemplary process, which may be performed in embodiments consistent with the subject matter of this disclosure, for detecting gestures based on vision-based motion input. The process may begin with a portable processing device, such as, for example, portable processing device 200, detecting a motion or a change in lighting conditions (act 1002).

Figure 11:
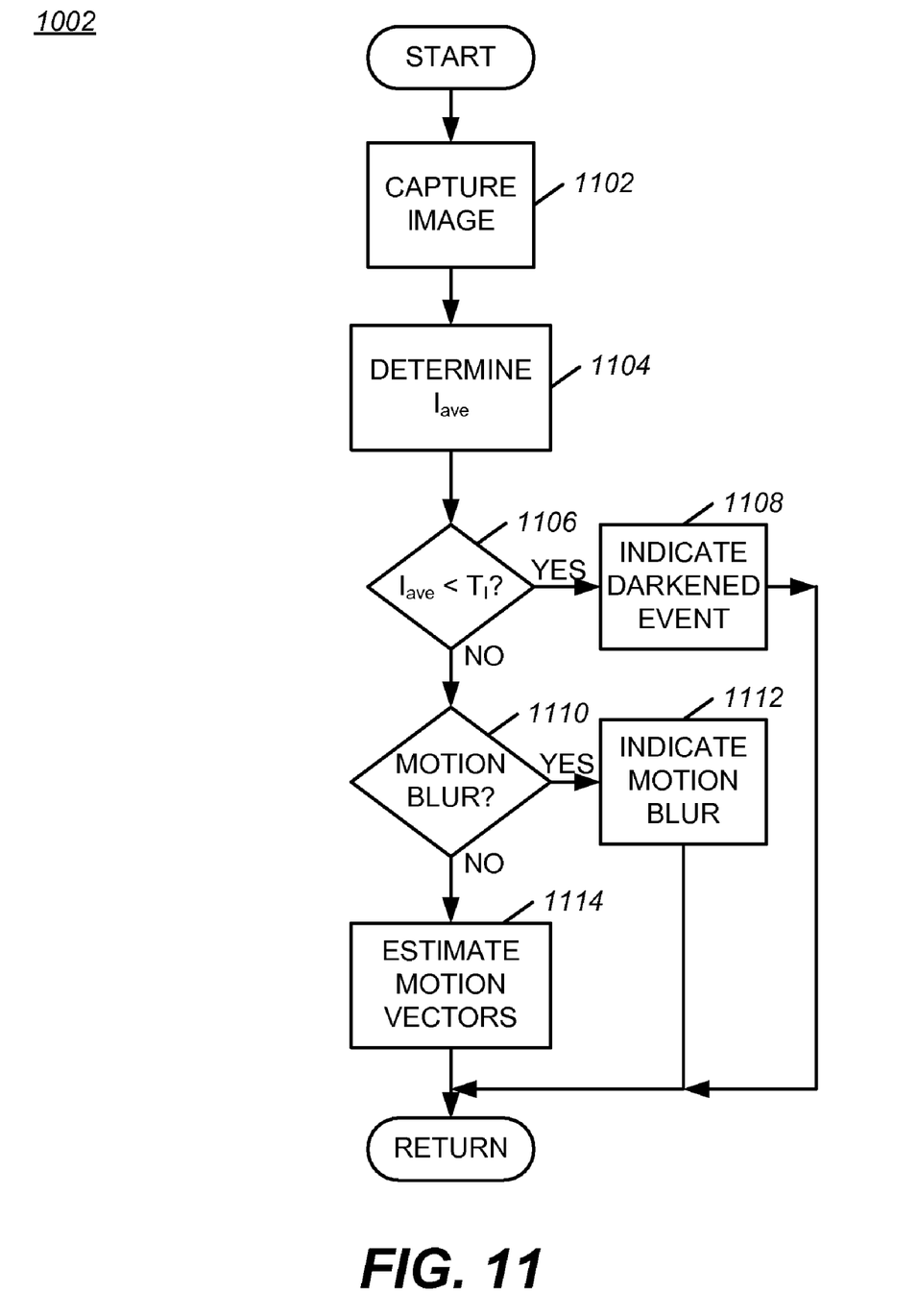
FIG. 11 is a flowchart illustrating an exemplary process for performing act 1002 of FIG. 10.

FIG. 11 is a flowchart of an exemplary process for performing act 1002 of FIG. 10 in embodiments consistent with the subject matter of this disclosure. The process may begin with image capturing component 170 of portable processing device 200 capturing an image in an image frame (act 1102). Next, portable processing device 200 may estimate an average pixel intensity, $I_{ave}$, over center blocks of each region of the image frame (act 1104). Portable processing device 200 may then determine whether $I_{ave}$ is below a threshold, $T_I$ (act 1106). In one embodiment, the threshold $T_I$ may be determined by collecting a set of images with image-capturing component 170 under different lighting conditions, during which a view of image-capturing component 170 may be blocked from time to time. A Gaussian distribution may be fit with mean $\mu_I$ and variance $\sigma_I^2$ onto the average pixel intensities over the collected set of images. The threshold $T_I$ may be set to $\mu_I - 3\sigma_I$.

If portable processing device 200 determines that $I_{ave} < T_I$, then a darkened event may be indicated (act 1108). An example of a darkened event may include passing an object, such as a hand or other object, over a lens of image-capturing component 170. Otherwise, portable processing device 200 may determine whether the captured image includes motion blur (act 1110).

Generally, there may be two types of blurs: defocus blur and motion blur. Defocus blur results when an image-capturing component or camera is out of focus. Motion blur may occur when an object or an image-capturing component is moving quickly. Blurred images have common characteristics, such as a lack of sharp object boundaries. As a result, a simple and effective method may be implemented to determine if an image is blurred. Denoting $I_x$ (i, j) and $I_y$ (i, j) as image gradients in x and y directions at pixel location (i, j), respectively, $I_{Blur}$ may be defined as:

$$I_{Blur} = \sum_{k=1}^{n} \sum_{(i,j) \in B_k} |I_x(i, j)| + |I_y(i, j)| \quad \text{(Eq. 1)}$$

where $B_k$ indicates an m×m block centered at a center block of a $k^{th}$ region, and "n" is a number of regions included in an image frame. In one embodiment, the m×m block may be a 25×25 pixel block or another size, and n may be 4 or another value. If $I_{Blur}$ is smaller than a threshold $T_{Blur}$, the image may be regarded as being blurred.

When motion blur occurs, a background scene may be subject to a dramatic change due to a large motion. When defocus blur occurs, differences between image frames may be subtle because the motion is small. Denoting $I_t(i, j)$ as pixel intensity at timeframe t, $I_m$ may be defined as:

$$I_m = \sum_{k=1}^{n} \sum_{(i,j) \in B_k} (I_t(i, j) - I_{t-1}(i, j))^2. \quad \text{(Eq. 2)}$$

If $I_m$ is larger than a threshold $T_m$ and $I_{Blur} > T_{Blur}$, then motion blur may be determined to have occurred. If $I_m \leq T_m$ and $I_{Blur} > T_{Blur}$, defocus blur may be determined to have occurred. $T_{Blur}$ and $T_m$ may be determined empirically.

Figure 12:
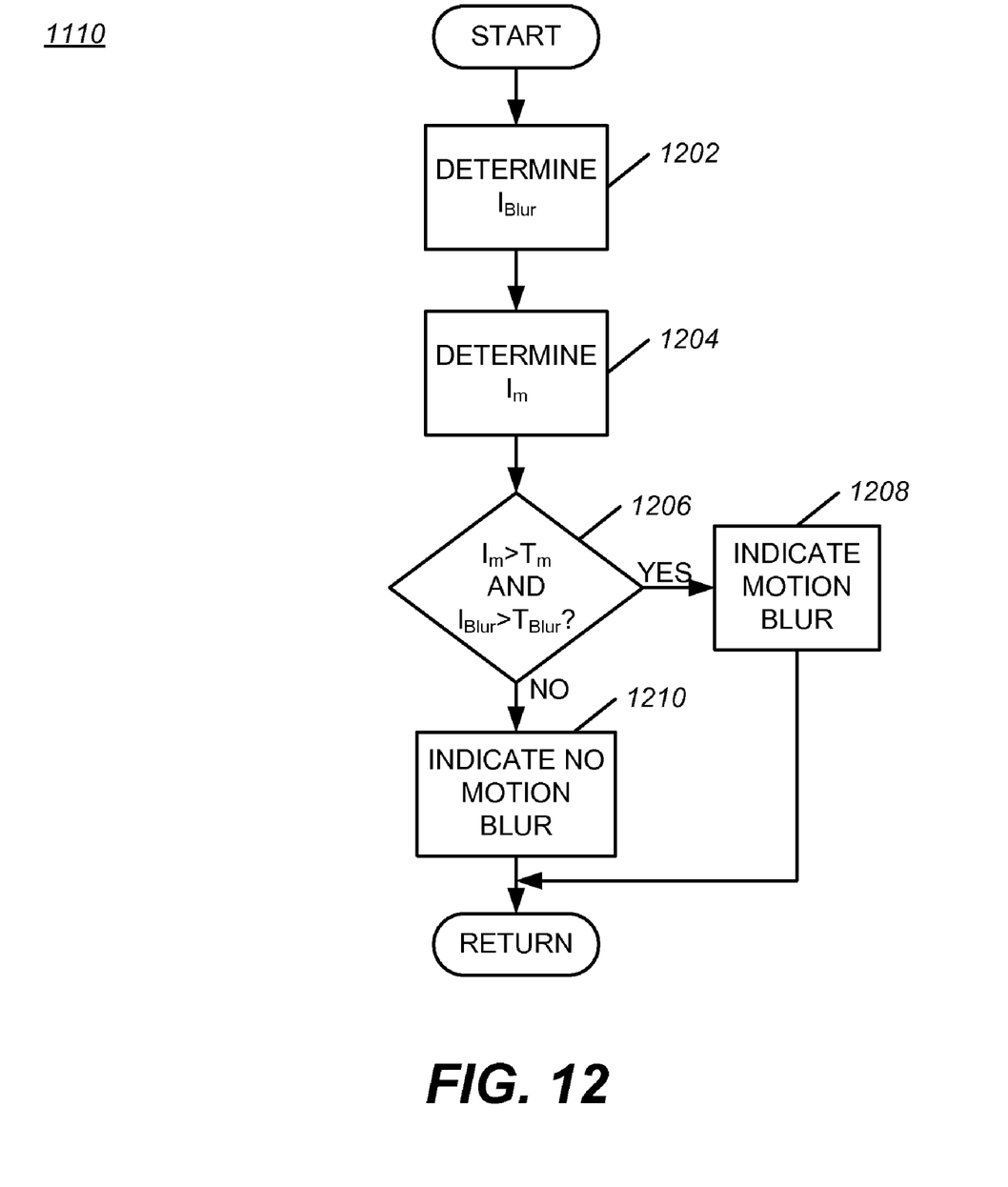
FIG. 12 is a flowchart illustrating an exemplary process for performing act 1110 of FIG. 11.

FIG. 12 is a flowchart of an exemplary process for performing act 1110 to determine whether the captured image includes motion blur. The process may begin with portable processing device 200 determining $I_{Blur}$ (act 1202). $I_{Blur}$ may be determined according to Eq. 1 defined above. Next, portable processing device 200 may determine $I_m$ (act 1204). $I_m$ may be determined according to Eq. 2 defined above. Portable processing device 200 may then determine whether ($I_m$>$T_m$) and ($I_{Blur}$>$T_{Blur}$) (act 1206). If portable processing device 200 determines that ($I_m$>$T_m$) and ($I_{Blur}$>$T_{Blur}$) then portable processing device 200 may indicate that motion blur occurred (act 1208). Otherwise, portable processing device 200 may indicate that motion blur did not occur (act 1210). One example of a motion, which may cause motion blur, may be a rapid motion of portable processing device 200, such as, for example, flicking. Thus an occurrence of flicking may be detected in some embodiments.

Returning to FIG. 11, if, during act 1110, portable processing device 200 determined that motion blur occurred, then portable processing device 200 may indicate an occurrence of motion blur (act 1112). Otherwise, portable processing device 200 may estimate motion vectors with respect to the captured image (act 1114).

Figure 13:
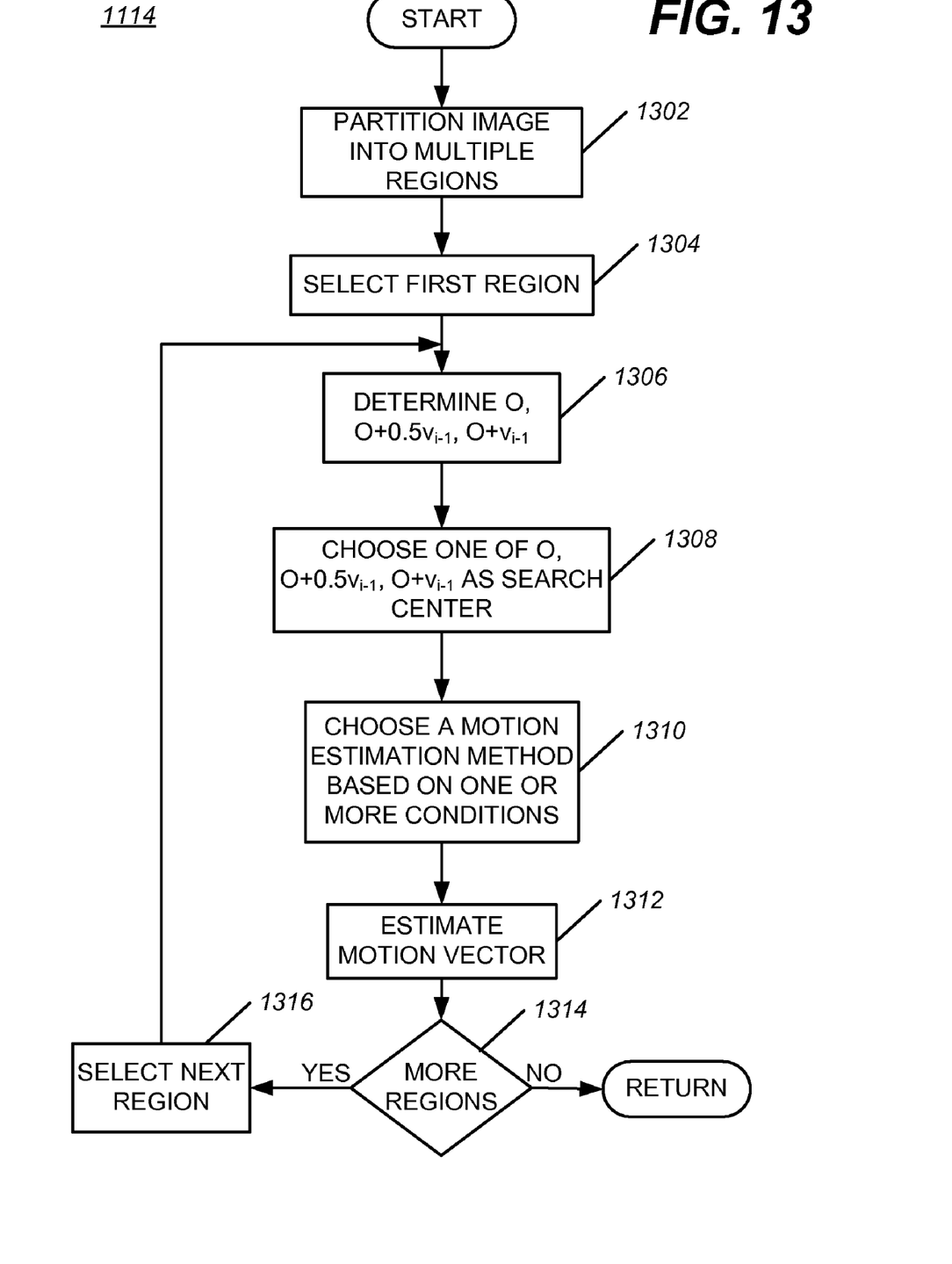
FIG. 13 is a flowchart illustrating an exemplary process for performing act 1114 of FIG. 11.

FIG. 13 is a flowchart illustrating an exemplary process for performing act 1114 to estimate motion vectors with respect to the captured image. The process may begin with portable processing device 200 partitioning an image frame including the captured image into multiple equal-sized regions (act 1302). Each of the multiple regions may have a subset including a block of pixels. The block of pixels may be a center block, which may be of size 16×16 pixels, or another suitable size. Portable processing device 200 may then select a first region of the multiple regions (act 1304). Portable processing device 200 may then determine a zero search center O, O+$0.5v_{i-1}$, and O+$v_{i-1}$, where $v_{i-1}$ may be a motion vector estimated with respect to a corresponding region of an image frame of a previously captured image (act 1306). Portable processing device 200 may select one of zero search center O, O+$0.5v_{i-1}$, or O+$v_{i-1}$ as an adapted search center for the region (act 1308). In one embodiment, portable processing device 200 may select one of zero search center O, O+$0.5v_{i-1}$, or O+$v_{i-1}$ using SSD of pixel intensities as a matching criterion.

Next, portable processing device 200 may choose a motion estimation method based on one or more conditions (act 1310). The motion estimation method may include any of the fast block searching methods previously mentioned, as well as any other methods. Further, the conditions may include battery power, processor load, historical matching accuracies of each of the candidate motion estimation methods, as previously mentioned, or other conditions.

Portable processing device 200 may then estimate a motion vector with respect to each of the multiple regions, according to the chosen motion estimation method (act 1312). The chosen motion vector estimation method may estimate respective motion vectors based on corresponding positions of matching blocks of pixels, as determined by one of the fast block matching methods, with respect to positions of corresponding blocks of pixels in respective regions of the image frame of the previously captured image. Processing device 200 may then determine whether any additional regions are to be examined (1314). If no additional regions are to be examined, then the process may be completed. Otherwise, portable processing device 200 may select a next region (act 1316) and acts 1306-1314 may be repeated.

Returning to FIG. 11, after performing act 1114, the process described by FIG. 11 may be completed.

Returning to FIG. 10, after performing act 1002, portable processing device 200 may determine whether recording mode is enabled (act 1004). While the recording mode is enabled, a complex gesture may be defined by recording a set of one or more motions and/or lighting conditions. If portable processing device 200 determines that recording mode is enabled, then portable processing device 200 may record the detected motions and/or lighting condition as part of the recorded set of one or more motions and/or lighting conditions (act 1006).

If portable processing device 200 determines that the recording mode is not enabled, then portable processing device 200 may determine whether the detected motion and/or lighting condition, or a previous group of detected motions and/or lighting conditions, ending with a current detected motion and/or lighting condition, matches a predefined gesture (act 1008). If portable processing device 200 determines that the detected movement and/or lighting condition, or a previous group of detected motions and/or lighting conditions, ending with a current detected motion and/or lighting condition, matches a predefined gesture, then an action associated with the predefined gesture may be performed by portable processing device 200 (act 1010). The motion and/or lighting condition may be detected by analyzing the motion vectors, any indicated darkened events, and any indicated motion blurs of the multiple regions of the captured image. For example, a gesture, such as, for example, rotating portable processing device 200 clockwise may cause an increase in volume and rotating portable processing device 200 counterclockwise may cause a decrease in volume. In other embodiments, rotating portable processing device 200 clockwise or counter-clockwise may cause a different action to be performed.

If portable processing device 200 determines that the detected motion and/or lighting condition does not match a predefined gesture, then portable processing device 200 may determine whether a sequence of motion events and/or lighting conditions, ending with a current detected motion event or lighting condition, matches a recorded gesture, which may be a complex gesture (act 1012). If the sequence of motion events and/or lighting conditions ending with the current detected motion event and/or lighting condition, matches a particular series of motion events, such as the recorded gesture, then a user-associated action may be performed by processing device 200 (act 1014). For example, when portable processing device 200 detects a sequence of motion events and/or lighting conditions matching the particular series of motion events, portable processing device 200 may perform an action, such as, for example, clearing a display screen and closing an application, or performing another action.

In some embodiments, a beginning and an end of a gesture may not be explicitly specified. Thus, processing device 200 may constantly attempt to match predefined or specified shapes against a stream of received motion events.

Figure 14:
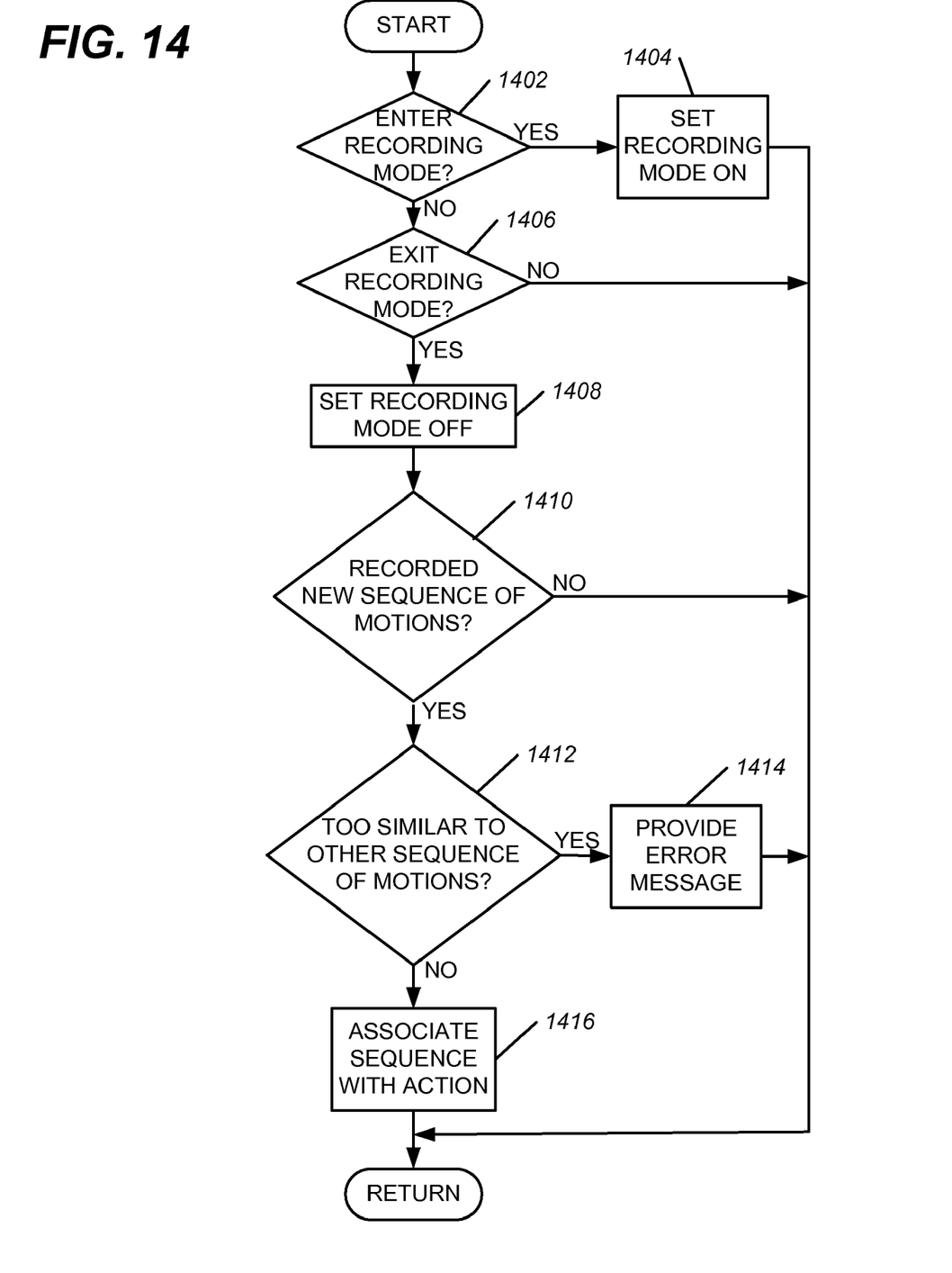
FIG. 14 is a flowchart illustrating an exemplary process for setting a recording mode to on and off and for associating an action with a recorded sequence of motions and/or lighting conditions.

FIG. 14 is a flowchart illustrating an exemplary process regarding entering and exiting a recording mode. While in recording mode, motions, motion blurs, and/or lighting conditions may be recorded to define a complex gesture associated with a particular action. In one embodiment, the recording mode may be entered by pressing one of buttons 204 of portable processing device 200. The recording mode may be exited by again pressing the one of buttons 204 of portable processing device 200. In other embodiments, other methods of entering and exiting the recording mode may be implemented.

The process may begin by portable processing device 200 determining whether the recording mode is being entered (act 1402). This may occur when portable processing device 200 detects a pressing of the one of the buttons 204 while the recording mode is off. If portable processing device 200 determines that the recording mode is being entered, then portable processing device 200 may set the recording mode to on (act 1404).

If, during act 1402, portable processing device 200 determines that the recording mode is not being entered, then portable processing device 200 may determine whether the recording mode is being exited (act 1406). The recording mode may be exited when portable processing device 200 detects a pressing of the one of the buttons 204 while the recording mode is on. If portable processing device 200 determines that the recording mode is being exited, then the recording mode may be set to off (act 1408).

Portable processing device 200 may then determine whether a new sequence of motions and/or lighting conditions have just been recorded (act 1410). If portable processing device 200 determines that a new sequence of motions and/or lighting conditions has been recorded, then portable processing device 200 may determine whether the new sequence of motions and/or lighting conditions is too similar to another sequence of motions and/or lighting conditions (act 1412). For example, if a previously recorded sequence of motions and/or lighting conditions is identical to the new sequence of motions and/or lighting conditions, except for one motion, which may vary slightly, then the new sequence of motions and/or lighting conditions may be determined to be too similar (or confusingly similar) to the previously recorded sequence of motions and/or lighting conditions.

If the new sequence of motions and/or lighting conditions is determined to be too similar to the previously recorded sequence of motions and/or lighting conditions, then portable processing device 200 may provide an error message to a user indicating that the new sequence of motions and/or lighting conditions is confusingly similar to the previously recorded sequence of motions and/or lighting conditions (act 1414). Otherwise, portable processing device 200 may permit the user to associate an action with the new sequence of motions and/or lighting conditions (act 1416). For example, in some embodiments the user may select an action from a menu of actions, displayed on a display screen of portable processing device 200, to be associated with the new sequence of movements or lighting conditions. The action may be selected by making a gesture with portable processing device 200, by using a finger or a stylus on a touchscreen of portable processing device 200, by using a pointing device with portable processing device 200, or via other input means.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents only define the invention, rather than any specific examples given.

We claim as our invention:

1. A machine-implemented method performed on a portable processing device including an image-capturing component, the machine-implemented method comprising:
   capturing a first image frame via the image-capturing component, the captured first image frame having a plurality of regions, each of the plurality of regions having a subset comprising a block of pixels;
   capturing a second image frame via the image-capturing component, the captured second image frame having a plurality of regions;
   adaptively searching for a matching block of pixels in each of the plurality of regions of the captured second image frame with respect to a corresponding one of the block of pixels in respective ones of the plurality of regions of the captured first image frame, the adaptively searching further comprising:
      selecting one of a plurality of fast block matching methods for matching the blocks of pixels and for estimating corresponding motion vectors, the selecting being based on one or more conditions including at least one condition from a plurality of conditions consisting of battery power of a battery of the portable processing device, processor load of the portable processing device, and historical matching accuracy of each of the plurality of fast block matching methods; and
   estimating a motion vector with respect to each of the plurality of regions of the captured second image frame based on positions of the matching blocks of pixels with respect to positions of the blocks of pixels in the respective ones of the plurality of regions of the first image frame.

2. The machine-implemented method of claim 1, wherein adaptively searching for a matching block of pixels in each of the plurality of regions of the captured second image frame with respect to a corresponding one of the block of pixels in respective ones of the plurality of regions of the captured first image frame further comprises:
   searching for the matching blocks of pixels in each of the plurality of regions of the captured second image frame by searching blocks of pixels based on a previously-estimated motion vector.

3. The machine-implemented method of claim 1, further comprising:
   detecting one of a plurality of predefined gestures based, at least partly, on estimated motion vectors with respect to each of a plurality of regions of at least one captured image frame, including the second image frame; and
   causing the portable processing device to perform a predefined action associated with the detected one of the plurality of predefined gestures.

4. The machine-implemented method of claim 1, further comprising:
   recording a user-defined gesture in a gesture recording mode; and
   associating the user-defined gesture with a particular action to be performed by the portable processing device.

5. The machine-implemented method of claim 1, further comprising:
   recording a user-defined gesture in a gesture recording mode;
   associating the user-defined gesture with a particular action to be performed by the portable processing device;
   detecting the user-defined gesture based, at least partly, on estimated motion vectors with respect to each of a plurality of regions of at least one captured image frame, including the second image frame; and causing the portable processing device to perform the particular action associated with the detected user-defined gesture.

6. The machine-implemented method of claim 1, further comprising:

detecting one of a plurality of predefined gestures based, at least partly, on estimated motion vectors with respect to each of a plurality of regions of at least one captured image frame, including the second image frame; and causing the portable processing device to perform a predefined action associated with the detected one of the plurality of predefined gestures, wherein:

the one of the plurality of predefined gestures is detected based on at least one motion of the portable processing device as determined by an estimated plurality of motion vectors.

7. A portable processing device comprising:

at least one processor;

an image-capturing component;

at least one storage component connected to the at least one processor and the image-capturing component, some of the at least one storage component comprising:

instructions for selecting one of a plurality of fast block matching methods for searching for a matching block of pixels in each of a plurality of regions of a captured second image frame with respect to a corresponding block of pixels in respective ones of a plurality of regions of a captured first image frame and for estimating corresponding motion vectors, the selecting being based on one or more conditions including at least one condition from a plurality of conditions consisting of battery power of a battery of the portable processing device, processor load of the portable processing device, and historical matching accuracy of each of the plurality of fast block matching methods, instructions for detecting one of a plurality of gestures based on at least one detected motion of the portable processing device, as determined by using the selected one of the plurality of fast block matching methods for detecting at least one motion based on images captured by the image-capturing component, at least one of the plurality of gestures including at least one motion from a set of motions comprising panning, tilting, spinning, rotation, flicking, depth-in and depth-out, and instructions for performing a predefined action associated with the detected one of the plurality of gestures.

8. The portable processing device of claim 7, wherein the instructions for detecting one of a plurality of gestures further comprise:

instructions for determining whether a blurred image is due to defocus blur or motion blur.

9. The portable processing device of claim 7, wherein the instructions for detecting one of a plurality of gestures further comprise:

instructions for capturing a plurality of images via the image-capturing component, each of the images including a plurality of regions, instructions for adaptively searching for a matching block of pixels in each of the plurality of regions with respect to two of the plurality of images, instructions for estimating a respective motion vector for each of the plurality of regions based on positions of respective ones of the matching block of pixels, and instructions for detecting the one of the plurality of gestures based, at least partly, on the estimated respective motion vectors for each of the plurality of regions.

10. The portable processing device of claim 7, wherein some of the at least one storage component further comprises:

instructions for recording a series of motion sequences during a gesture recording mode, and instructions for associating the recorded series of motion sequences with an action to be performed by the portable processing device.

11. The portable processing device of claim 7, wherein some of the at least one storage component further comprises:

instructions for recording a plurality of motion sequences during a gesture recording mode, instructions for associating the recorded plurality of motion sequences with an action to be performed by the portable processing device, instructions for recognizing a second plurality of motion sequences matching the recorded plurality of motion sequences, and instructions for performing the action when the second plurality of motion sequences is recognized as matching the recorded plurality of motion sequences.

12. The portable processing device of claim 7, wherein at least one storage component further comprises:

instructions for detecting a wiping gesture, and instructions for performing an action associated with the wiping gesture when the wiping gesture is detected.

13. A dynamic or static storage device having instructions recorded therein for at least one processor of a processing device to perform a method comprising:

detecting one of a plurality of motions based on using an adaptive block matching technique on a plurality of images captured by the processing device, the detecting further comprising:

selecting one of a plurality of fast block matching methods for matching a block of pixels in each of a plurality of corresponding regions of the plurality of images and for estimating corresponding motion vectors, the selecting being based on one or more conditions including at least one condition from a plurality of conditions consisting of battery power of a battery of the processing device, processor load of the processing device, and historical matching accuracy of each of the plurality of fast block matching methods;

recording a sequence of detected motions; and associating the sequence of detected motions with an action to be performed by the processing device.

14. The dynamic or static storage device of claim 13, wherein the detecting one of a plurality of motions based on using an adaptive block matching technique on a plurality of images captured by the processing device further comprises:

detecting a change in orientation of the processing device based on using the adaptive block matching technique on the plurality of images captured by the processing device.

15. The dynamic or static storage device of claim 13, wherein the detecting one of a plurality of motions based on using an adaptive block matching technique on a plurality of images captured by the processing device further comprises:

distinguishing motion blur from defocus blur in the plurality of images.

16. The dynamic or static storage device of claim 13, wherein the method further comprises:

recognizing an occurrence of a sequence of detected motions matching the recorded sequence of detected motions, and performing the action associated with the recorded sequence of detected motions in response to recognizing the occurrence of a sequence of detected motions matching the recorded sequence of detected motions.

17. The dynamic or static storage device of claim 13, wherein the method further comprises:

notifying a user of an error when the recorded sequence of detected motions is confusingly similar to a previously-entered recorded sequence of detected motions.

18. The machine-implemented method of claim 1, wherein a sum of squared difference of pixel intensities are used as a matching criterion with respect to comparing pixels of one image frame with pixels of another image frame.

19. The portable processing device of claim 7, wherein the plurality of fast block matching methods include at least two methods selected from a group of methods consisting of a three step search, a four step search, a diamond search, a hexagon search, and an adaptive multi-mode search.

20. The dynamic or static storage device of claim 13, wherein the method further comprises:

obtaining a historical matching accuracy of each of the plurality of fast block matching methods by evaluating accuracies of each of the plurality of fast block matching methods every predetermined number of image frames and accumulating the accuracies over a shifting time window.

* * * * *